(12) United States Patent
Imada et al.

(10) Patent No.: US 7,976,761 B2
(45) Date of Patent: Jul. 12, 2011

(54) PROCESS OF PRODUCTION OF PATTERNED STRUCTURE

(75) Inventors: Aya Imada, Tokyo (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 313 days.

(21) Appl. No.: 11/773,739

(22) Filed: Jul. 5, 2007

(65) Prior Publication Data

US 2008/0023880 A1 Jan. 31, 2008

(30) Foreign Application Priority Data

Jul. 26, 2006 (JP) ................................ 2006-202802

(51) Int. Cl.
*B29C 59/02* (2006.01)
(52) U.S. Cl. ......... 264/319; 264/293; 264/294; 977/887
(58) Field of Classification Search .................. 264/319, 264/293, 496, 299, 294; 977/887
See application file for complete search history.

(56) References Cited

U.S. PATENT DOCUMENTS

| | | | | |
|---|---|---|---|---|
| 5,472,812 A | | 12/1995 | Sekine | 430/5 |
| 5,772,905 A | | 6/1998 | Chou | 216/44 |
| 6,309,580 B1 | | 10/2001 | Chou | 264/338 |
| 6,482,742 B1 | | 11/2002 | Chou | 438/690 |
| 6,518,189 B1 | | 2/2003 | Chou | 438/706 |
| 6,602,620 B1 | | 8/2003 | Kikitsu et al. | 428/842.2 |
| 6,809,356 B2 | | 10/2004 | Chou | 257/225 |
| 6,818,139 B1 | * | 11/2004 | Lee et al. | 216/49 |
| 6,828,244 B2 | | 12/2004 | Chou | 438/706 |
| 6,946,360 B2 | | 9/2005 | Chou | 438/455 |
| 6,999,156 B2 | | 2/2006 | Chou et al. | 349/196 |
| 7,037,420 B2 | | 5/2006 | Yoshida et al. | 205/88 |
| 7,114,938 B2 | | 10/2006 | Chou | 425/126.1 |
| 7,137,803 B2 | | 11/2006 | Chou | 425/405.1 |
| 7,211,214 B2 | | 5/2007 | Chou | 264/446 |
| 7,322,287 B2 | | 1/2008 | Tan et al. | 101/28 |
| 2004/0137734 A1 | | 7/2004 | Chou et al. | 438/689 |
| 2005/0005801 A1 | * | 1/2005 | Thallner | 101/483 |
| 2005/0064054 A1 | | 3/2005 | Kasumi et al. | 425/112 |
| 2006/0144275 A1 | * | 7/2006 | Kolesnychenko et al. | 101/483 |

FOREIGN PATENT DOCUMENTS

| | | |
|---|---|---|
| CN | 1726433 A | 1/2006 |
| JP | 2003-068618 | 3/2003 |
| JP | 2004-296780 | 10/2004 |
| JP | 2005100499 | * 4/2005 |

OTHER PUBLICATIONS

JP 2005100499 (Machine Translation) [online], [retrieved on Jul. 2, 2010], retrieved from PAJ Database (http://www19.ipdl.inpit.go.jp/PA1/cgi-bin/PA1INDEX).*

* cited by examiner

*Primary Examiner* — Matthew J Daniels
*Assistant Examiner* — Yana Belyaev
(74) *Attorney, Agent, or Firm* — Fitzpatrick, Cella, Harper & Scinto

(57) ABSTRACT

A process for producing a patterned structure comprises imprinting a first pattern by pressing a stamper having a projection-depression configuration on the surface against an imprint-work layer, and imprinting a second pattern by displacing relatively the stamper from the position of the first pattern to another position on the imprint-work layer and then pressing the stamper against the imprint-work layer.

6 Claims, 3 Drawing Sheets

PROCESS OF PRODUCTION OF PATTERNED STRUCTURE

CROSS REFERENCE TO RELATED APPLICATION

This application claims the benefit of Japanese Patent Application No. 2006-202802, filed Jul. 26, 2006, which is hereby incorporated by reference herein in its entirety.

BACKGROUND OF THE INVENTION

1. Field of the Invention

The present invention relates to a process for producing a patterned structure, particularly to a process for producing a structure having a nano-scale pattern by repeated imprinting operations.

2. Description of the Related Art

Known techniques for forming a fine pattern include photolithography, electron-ray exposure, X-ray exposure, and nano-imprint lithography. A photolithography technique is disclosed in U.S. Pat. No. 5,472,812; an electron-ray exposure technique is disclosed in Japanese Patent Application Laid-Open No. 2003-068618; an X-ray exposure technique is disclosed in Japanese Patent Application Publication No. 2004-296780; and a nano-imprint lithography technique is disclosed in US Patent Application Laid-Open No. 2005/064054. Such a technique for direct drawing of a pattern like the electron-ray drawing and the ion-beam drawing requires a longer time for forming a finer pattern. Therefore, fine pattern formation in mass production at a lower cost is conducted mainly through steps of preparing precisely a mask for X-ray exposure, UV-ray exposure, of press molding by direct drawing and forming a pattern collectively in a shorter time by photolithography or nano-imprint lithography.

However, in any of the above techniques, the fineness of the formed structure is limited. The electron-ray exposure technique, which is the most precise at the moment, is capable of forming single dots of 10 nm diameter, but is not capable of forming readily an arrangement of dots of this size in a dot arrangement pitch of 20 nm or less readily.

Other known processes for forming a fine structure include anodic oxidation of aluminum or a like material, and a bottom-up process by utilizing a molecular self-organization structure. The anodic oxidation of aluminum is disclosed in U.S. Patent Application Publication No. 2004/206632, and the bottom-up process for fine structure formation is disclosed in U.S. Pat. No. 6,602,620. Such methods are suitable for forming a regular periodic structure in a large area, but are not suitable for forming an arbitrary structure.

SUMMARY OF THE INVENTION

The present invention intends to provide a simpler process for producing a structure having a nano-scale pattern.

The present invention is directed to a process for producing a patterned structure, comprising: imprinting a first pattern by pressing a stamper having a projection-depression configuration on the surface against an imprint-work layer, and imprinting a second pattern by displacing relatively the stamper from the position of the first pattern to another position on the imprint-work layer and then pressing the stamper against the imprint-work layer.

The projection-depression configuration on the surface of the stamper can be comprised of projections or depressions arranged in a tetragonal lattice, and depressions or projections of the second pattern are formed on gravity center positions of the tetragons of unit cells of the tetragonal lattice arrangement of the first pattern on the imprint-work layer.

The projection-depression configuration on the surface of the stamper can be comprised of projections or depressions arranged in a trigonal lattice; depressions or projections of the second pattern are formed on gravity center positions of the trigons of unit cells of the trigonal lattice arrangement of the first pattern on the imprint-work layer; and further, depressions or projections of a third pattern are formed on gravity center positions of the triangles of unit cells of the trigonal lattice arrangement of the first pattern on which gravity center positions the depressions or projections of the second pattern have not been formed.

The present invention is directed to a process for producing a patterned structure having a pattern set forth in the above, wherein the imprint-work layer is comprised of a thermoplastic material.

The second pattern can be formed under a condition different from a condition under which the first pattern is formed to form the depressions or projections of the second pattern in the same shape as of the first pattern.

The condition under which the second pattern is formed can be adjusted by changing at least one of the temperature of heating the imprint-work layer and the stamper, the pressure of pressing the stamper, and the time of pressing with the stamper.

The present invention enables production of a nano-scale structure through a simple process.

Further features of the present invention will become apparent from the following description of exemplary embodiments with reference to the attached drawings.

DESCRIPTION OF THE EMBODIMENTS

Figure 1A:
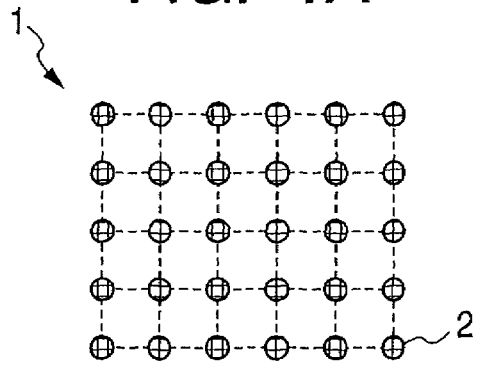
FIGS. 1A, 1B, and 1C illustrate a process for producing a structure having a square lattice pattern in Example 1 of the present invention.

The present invention enables constitution of a process for producing a patterned structure in which a layer of a thermoplastic resin or a like thermoplastic material formed on a substrate is pressed with a stamper two or more times. This repeated imprinting enables formation of a pattern on a structure finer than the arrangement pattern of the projections or depressions on the stamper (hereinafter referred to as a "stamper pattern").

The stamper of the present invention has a stamper pattern (projection-depression) on its surface. The base material of the stamper bearing the projections or depressions includes silicon (Si) and nickel (Ni). Examples of the projections include cylindrical projections of 100 nm in diameter and 200 nm in height, and cylindrical projections of 50 nm in diameter and 150 nm in height.

The projection-depression of the stamper can be impressed on an imprint-work layer more precisely at a lower pressure by heating the layer to lower the hardness of the layer, pressing a stamper against the layer, cooling the layer and the stamper, and removing the stamper from the layer. The projections or depressions on the stamper, or the depressions or projections of the pattern on the imprint-work layer are hereinafter referred to as "pattern-constitution elements". The material of the imprint-work layer need not be thermoplastic insofar as the material allows precise transfer of the projection-depression shape of the stamper by pressing.

The stamper need not be pressed on the entire surface area of the imprint-work layer, but a portion of the layer may be locally pressed. The area to be pressed on the imprint-work layer is hereinafter referred to as a "pattern formation area".

In an embodiment of the present invention, a pattern on a stamper is imprinted on the imprint-work layer through the steps below. Firstly, a stamper having a projection-depression pattern of a nanometric scale is pressed against a pattern-formation area of the imprint-work layer to imprint a first pattern thereon (a first pattern imprinting step). Then one or both of the stamper and the workpiece are moved to displace the stamper from the position of the first pattern, and the stamper is pressed at least a part of the pattern formation area to form a second pattern (a second pattern imprinting step). Through the above steps, a pattern finer than the stamper pattern, constituted of the first pattern and the second pattern, can be formed on a workpiece. A pattern formed by repeating the imprinting of a pattern on an imprint-work layer is occasionally referred to a "multiple pattern".

The pattern imprinting may be conducted three or more times. The second imprinting or later imprinting is conducted to form depressions or projections at positions different from the positions of the pattern-constitution elements having already been formed in the pattern-formation area. In order not to cause overlap of depressions or projections in the multiple pattern, the dimension of the depression or projection in the pattern is preferably made smaller than the periodic intervals in the final multiple pattern to be formed on the imprint-work layer. For example, cylindrical projections of the stamper are made smaller than the periodic intervals.

Figure 1B:
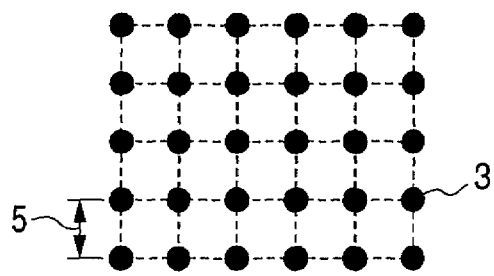
Figure 1C:
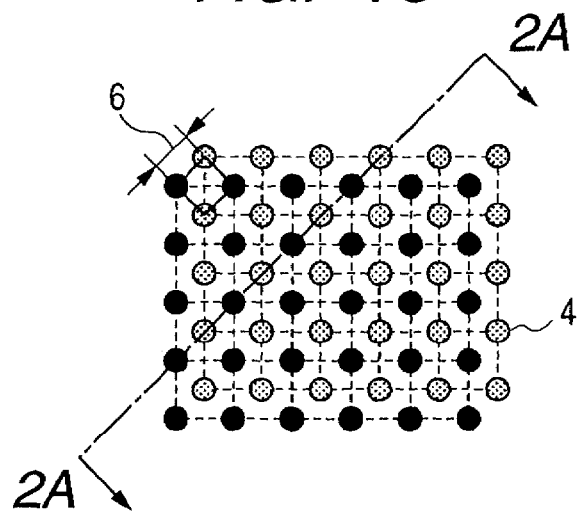

By optimizing the position of the stamper in the second pattern imprinting, a pattern similar to the first pattern can be formed with decreased periodic intervals in the resulting double pattern. For example, when a stamper is used which has projections in a tetragonal lattice pattern having a pitch A (reference numeral 5 in FIG. 1B), the position of the stamper at the second imprinting is adjusted to bring the constitution elements of the second pattern onto the gravity centers of tetragonal unit cells of the first pattern. As the result, the doubled pattern formed from the first pattern and the second pattern is a tetragonal lattice having a pitch (reference numeral 6 in FIG. 1C) of A'=A/$\sqrt{2}$ (FIGS. 1A-1C). Similarly, when a stamper is used which has a trigonal lattice pattern having a pitch B (reference numeral 7 in FIG. 3B), the position of the stamper in the second imprinting is adjusted to bring the constitution elements of the second pattern onto the gravity centers of trigonal unit cells of the first pattern. Further, the position of the stamper at the third imprinting is adjusted to bring the constitution elements of the third pattern onto the gravity centers of trigonal unit cells of the first pattern where the depressions of the second pattern have not been formed. As the result, the triple pattern constituted of the first, second, and third patterns becomes a trigonal lattice having a pitch (reference numeral 8 in FIG. 3D) of B'=B/$\sqrt{3}$ (FIGS. 3A-3D). The position of the stamper can be adjusted by reference to an alignment mark provided in the imprint-work layer, or by placing the imprint-work layer on a piezo-stage.

Figure 2A:
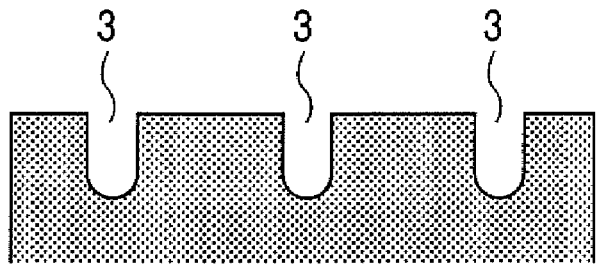
FIGS. 2A, 2B, and 2C illustrate change of a shape of already formed depressions in a thermoplastic imprint-work layer caused by subsequent pressing.
Figure 2B:
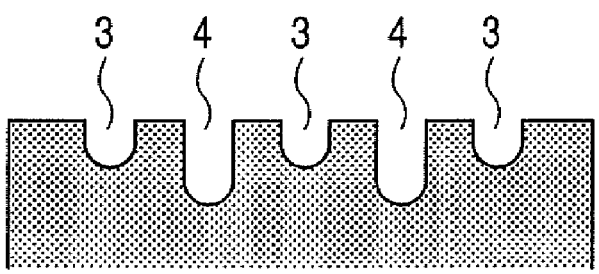
Figure 2C:
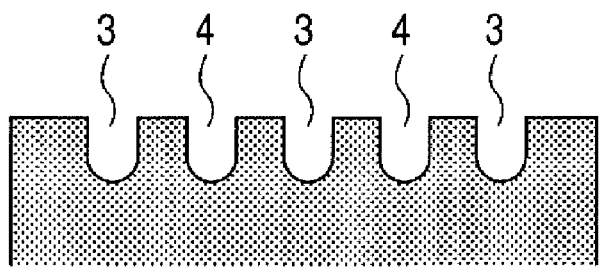

In the case where the pattern shape is imprinted on a thermoplastic imprint-work layer by thermal imprinting, the depressions or projections of the pattern having formed by prior imprinting can be deformed by heat of the subsequent thermal imprinting. For example, when a work-piece constituted of a Si substrate and a polymethyl methacrylate (hereinafter referred to as PMMA) of 200 nm thick is used and a first pattern formation and a second pattern formation are conducted under conditions of 120° C. and 1 tonf/cm$^2$ for one minute, with a stamper having cylindrical projections of 100 nm in diameter and 200 nm in height arranged at a pitch of 300 nm in a square lattice, the depressions of the first pattern as shown in FIG. 2A come to be deformed by heat and by pressure applied to surrounding portions to cause decrease of the depth, as shown in FIG. 2B. On the other hand, the depressions 4 in the second pattern formed have the same shape as the depressions 3 having been formed at the first pattern imprinting before the deformation.

In order to obtain the same shape of the constituting elements of the two patterns, the pattern formation conditions should be changed for the respective two patterns. In the present invention, the difference in the shape of the pattern-constitution elements can be prevented by adjusting pattern formation conditions such as the heating temperature, the imprinting pressure, and the imprinting temperature. For instance, in the second pattern formation, at least one of the heating temperature, the pressing pressure, and pressing time is adjusted: the heating temperature to be lower, the imprinting pressure to be higher, or the imprinting time to be longer.

EXAMPLES

Example 1

An imprint-work layer is formed from PMMA in a thickness of 200 nm by spin coating on a Si substrate.

Stamper 1, which has cylindrical projections of 100 nm in diameter and 200 nm in height arranged in a square lattice of a 300-nm pitch, is prepared by photolithographic etching of the surface of a stamper base material of nickel (Ni) (FIG. 1A).

Stamper 1 is fixed onto a piezo-stage with projections 2 of the stamper opposed to an imprint-work layer. The imprint-work layer and stamper 1 are heated to 120° C. and the stamper is pressed against the imprint-work layer at a pressure of 1 tonf/cm$^2$ for one minutes. Then the imprint-work layer and stamper 1 are cooled to 60° C., and stamper 1 is removed. Thus a first pattern having depressions 3 corresponding to projections 2 is formed in a tetragonal lattice (pitch 5: A=300 nm), (FIG. 1B). The area of the imprint-work layer in which the pattern is formed is named a pattern formation area.

Then, stamper 1 is displaced relatively from the position of the first pattern to another position to bring projections 2 onto the gravity centers of the tetragon-constituting unit cells of the first pattern by reference to an alignment mark and by using a piezo-stage.

Depressions of a second pattern are formed with stamper 1 under the same conditions for imprinting of the first pattern. The resulting double pattern constituted of the first pattern and the second pattern has a tetragonal lattice arrangement having a pitch 6 of A'=A/$\sqrt{2}$=212 nm in an arrangement direction shifted by an angle of 45° from that of the first pattern (FIG. 1C).

Example 2

A first pattern is imprinted under the same conditions as in Example 1. A second pattern is imprinted under the conditions of 80° C. and 1 tonf/cm$^2$ for one minute. In the resulting double pattern, the depth of the depressions of the first pattern come to be slightly decreased, whereas the depressions of the second pattern have depths smaller than the initial depths of the first pattern as just imprinted. Thereby, the depths of the depressions of the first pattern and of the second pattern are made nearly equal. When the temperature for the second pattern imprinting is set lower, the imprinting pressure is adjusted to be higher, or the imprinting time is adjusted to be longer.

Example 3

Figure 3A:
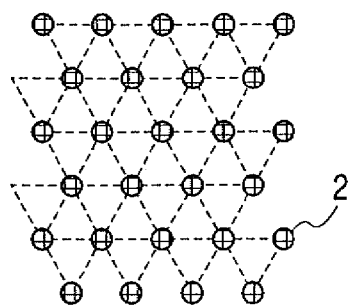
FIGS. 3A, 3B, 3C, and 3D illustrate a process for producing a structure having a trigonal lattice pattern in Example 3 of the present invention.

Stamper 1 is prepared which has cylindrical projections 2 of 100 nm in diameter and 200 nm in height arranged in a trigonal lattice of pitch 7 of B=300 nm on the surface of a stamper base material of nickel (Ni) (FIG. 3A).

Figure 3B:
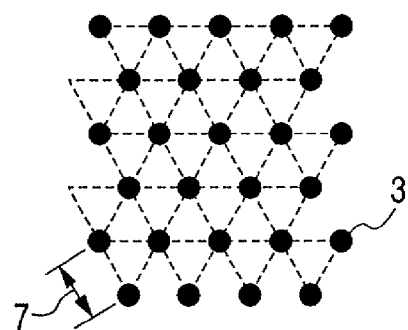

Depressions 3 of a first pattern is formed in the same manner as in Example 1 (FIG. 3B).

Figure 3C:
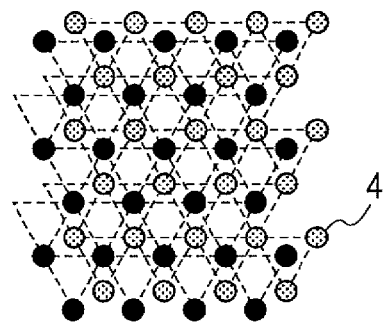

For second pattern imprinting, the position of the stamper is adjusted to form depressions at the gravity centers of the trigons of the unit cells of the trigonal lattice arrangement of the first pattern. Then the second pattern is impressed (FIG. 3C).

For third pattern imprinting, the position of the stamper is further adjusted to form depressions at the gravity centers of the trigons of the unit cells of the trigonal lattice arrangement of the first pattern where the depressions of the second pattern have not been formed. Then the third pattern is imprinted (FIG. 3C).

Figure 3D:
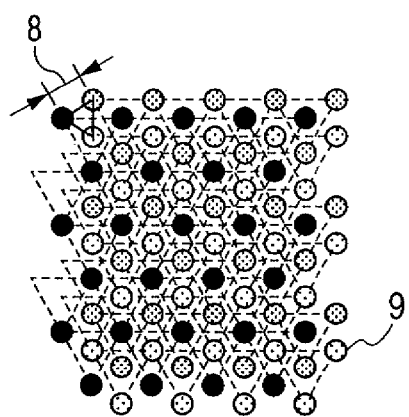

The resulting triple pattern formed from the first, second, and third patterns is a trigonal lattice pattern having pitch 8 of B'=B/√3=173 nm (FIG. 3D).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A process for producing a patterned structure, the process comprising:
    imprinting a first pattern by pressing a stamper having a projection-depression configuration on a surface thereof against an imprint-work layer to form the first pattern on a first region of the imprint-work layer; and
    imprinting a second pattern by displacing relatively the stamper from a position of the first pattern to another position on the imprint-work layer and then pressing the stamper against the imprint-work layer to form the second pattern on a second region of the imprint-work layer,
    wherein at least a portion of the second region of the imprint work layer overlaps at least a portion of the first region of the imprint work layer,
    wherein the first pattern and the second pattern have a same pitch,
    wherein the first pattern and the second pattern form a combined pattern on the imprint-work layer,
    wherein the combined pattern is formed in a finer pitch than the pitch of the first pattern and the second pattern,
    wherein the imprint-work layer includes a thermoplastic material, and
    wherein the first pattern is formed under a first temperature and the second pattern is formed under a second temperature lower than the first temperature, such that a depth of depressions of the first pattern and a depth of depressions of the second pattern are nearly equal.

2. The process for producing a patterned structure according to claim 1, wherein the projection-depression configuration on the surface of the stamper includes projections or depressions arranged in a tetragonal lattice, and depressions or projections of the second pattern are formed on gravity center positions of tetragons of unit cells of the tetragonal lattice arrangement of the first pattern on the imprint-work layer.

3. The process for producing a patterned structure according to claim 1, wherein the projection-depression configuration on the surface of the stamper includes projections or depressions arranged in a trigonal lattice, depressions or projections of the second pattern are formed on gravity center positions of a subset of trigons of unit cells of the trigonal lattice arrangement of the first pattern on the imprint-work layer, and depressions or projections of a third pattern are formed on gravity center positions of trigons of unit cells of the trigonal lattice arrangement of the first pattern on which depressions or projections of the second pattern have not been formed.

4. The process for producing a patterned structure according to claim 1, wherein the condition under which the second pattern is formed is adjusted by changing at least one of a temperature of heating the imprint-work layer and the stamper, a pressure of pressing the stamper, and a time of pressing with the stamper.

5. The process for producing a patterned structure according to claim 1, wherein the first pattern is formed under a first pressure and the second pattern is formed under a second pressure higher than the first pressure.

6. The process for producing a patterned structure according to claim 1, wherein the first pattern is formed with a first imprinting time and the second pattern is formed with a second imprinting time longer than the first imprinting time.

* * * * *